United States Patent
Mueller (10) Patent No.: US 6,315,449 B1
(45) Date of Patent: Nov. 13, 2001

(54) COMPLIANT HYDROSTATIC GUIDANCE OF MOVING LATHE CARRIAGE

(75) Inventor: Peter Michael Mueller, Suwanee, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/533,507

(22) Filed: Mar. 23, 2000

(51) Int. Cl.$^7$ .............................. F16C 32/06; F16C 29/02
(52) U.S. Cl. ................... 384/12; 384/10; 384/37
(58) Field of Search .................. 384/12, 13, 8, 384/10, 37, 38

(56) References Cited

U.S. PATENT DOCUMENTS

| | | | |
|---|---|---|---|
| 3,578,827 | * 5/1971 | Smith | 384/12 |
| 4,217,027 | 8/1980 | MacChesney et al. | 350/96.3 |
| 4,455,910 | * 6/1984 | Kraft et al. | 384/12 X |
| 4,643,590 | * 2/1987 | Olasz | 384/8 |
| 4,744,675 | * 5/1988 | Sakino et al. | 384/12 |
| 5,064,318 | * 11/1991 | Cirillo | 384/12 X |
| 5,382,095 | * 1/1995 | Akutsu | 384/12 X |

* cited by examiner

Primary Examiner—Thomas R. Hannon
(74) Attorney, Agent, or Firm—Thomas, Kayden, Horstemeyer & Risley, LL (57) ABSTRACT

A hydrostatic guidance system for a moving carriage upon a lathe bed or other such machining has a plurality of fluid, preferably air bearings mounted on the carriage and a pressurized fluid manifold device for routing the pressurized fluid to the air bearings. The several air bearings are located and oriented on the carriage adjacent the rails or ways of the machine so that the carriage is made to float, contact free, over the ways for smooth, jerk free movement. At least one of the air bearings is mounted on the distal end of a bendable beam which, under pressure of the air, maintains the gap between the bearing and the way despite variations in the straightness or linearity of the way so as to maintain a uniform velocity profile.

14 Claims, 6 Drawing Sheets

COMPLIANT HYDROSTATIC GUIDANCE OF MOVING LATHE CARRIAGE

RELATED APPLICATIONS

This application concerns subject matter related to that shown in U.S. patent application Ser. No. 09/353,943 of Mueller et al., filed Jul. 15, 1999, the disclosure of which is incorporated herein by reference, and to U.S. patent application Ser. No. 09/500154 filed Feb. 8, 2000, the disclosure of which is incorporated herein by reference.

FIELD OF THE INVENTION

This invention relates to an apparatus for supporting and compliantly guiding a movable lathe carriage and, more particularly, to such an apparatus for use in the MCVD process for producing optical fiber.

BACKGROUND OF THE INVENTION

Optical fiber of the type used to carry optical signals is fabricated typically by heating and drawing a portion of an optical preform comprising a refractive core surrounded by a protective glass cladding. Presently there are several known processes for fabricating preforms. The modified chemical vapor deposition (MCVD) process, which is described in U.S. Pat. No. 4,217,027, issued in the names of J. B. MacChesney et al. on Aug. 12, 1980 and assigned to Bell Telephone Laboratories, Inc., has been found to be one of the most useful because the process enables large scale production of preforms which yield very low loss optical fiber.

During the fabrication of preforms by the MCVD process, reactant-containing gases, such as $SiCl_4$ and $GeCl_4$ are passed through a rotating substrate tube suspended between the headstock and tailstock of a lathe. A torch assembly, which heats the tube from the outside as the gases are passed therethrough, traverses the length of the tube in a number of passes, and provides the heat for the chemical reactions and deposition upon the inner wall of the tube. The torch assembly also supplies the heat for collapsing the tube to form a rod, and, in subsequent operations, for collapsing an overclad tube onto the rod, as explained in the aforementioned Mueller et al.—943 application. In the current manufacture of preforms, the torch is mounted on a carriage which is a solid structure supported and guided on the lathe or machine bed. The guidance of the carriage along a specific path is usually accomplished through the use of a typical three sided gib and way system, with the carriage having rolling or sliding elements attached and in contact with the tops, sides, and bottoms of a dual way system. Linear guide rails having various cross-sections for rolling and sliding elements and mounted to the bed may be used as an alternative. In the systems as currently used, the sliding or rolling elements on the carriage are in direct contact with the bed of the lathe or machine or with the ways. In all such systems, the movement of the carriage and the physical contact between it and the bed requires lubrication to eliminate wear and friction. An initial "stick-skip" condition must be overcome during the start of carriage motion which is a result of the friction, and the friction can also induce "jerk" in the movement of the carriage along the bed. In addition, the friction can cause or induce, over a period of time, freeplay in the system as a result of wear. Thus, where a smooth uniform velocity of the torch down the length of the tube is a necessity for uniformity of heating and deposition and, ultimately, a uniformity of product, the friction effects can, and most often do, cause a non-uniform velocity profile, and, as a consequence, non-uniformity of heating and deposition, which result in non-uniformity of product. In present day practice, friction is overcome, at least in part, through the use of lubricants which, during a production run, become a contaminant to the process and spread throughout the machine. This, in turn, necessitates frequent cleaning of the apparatus which is detrimental to the goal of substantially continuous production. Further, the lubricant does not completely eliminate the stick-slip and jerk problems which, as pointed out in the foregoing, most often lead to a nonuniform velocity profile.

The related U.S. patent application Ser. No. 09/500,154 is directed to a carriage guidance system that substantially eliminates physical contact between the carriage and lathe bed and, hence, overcomes most if not all of the aforementioned problems. The arrangement shown in that application is a hydrostatic guidance and support system for the movable carriage upon which the torch for the MCVD process is mounted. The carriage, as used on the MCVD lathe, is equipped with integral air bearing components which, in their geometry, match the lathe bed cross-section. Fluid, such as air, under pressure, is delivered to the bearings which, under pressure of the air or whatever fluid is used, in use, cause the carriage to float in spaced relationship to the lathe, thereby producing a nearly friction free support and guide for the carriage, which results in a smooth velocity profile, which, in turn, produces a drastic improvement in the quality (and quantity) of the MCVD product. The terms "fluid" and "air" will be used interchangeably hereinafter.

In greater detail, the carriage comprises a top plate to which the torch is mounted, first and second side walls depending from the top plate, and first and second inward facing guidance members in the form of flanges extending inwardly from the bottoms of the side walls. The top plate has four downwardly oriented threaded bores extending therethrough which are spaced to overlie the rails or ways of the lathe bed. Threaded studs are mounted in the bores, each stud having a partially spherical end face which fits into a hole having a spherically shaped bottom in a porous pad member thereby creating a ball joint to hold the member in place, especially while in motion. In like manner, each of the side walls has similar bores aligned with the sides of the lathe rails and in which similar studs are mounted which hold similar porous pads. Each of the flanges has a pair of bores therein for studs which also hold porous pads, beneath the ways or rails of the lathe.

On each of the side walls is mounted an air manifold having at least one air input, and six outputs having needle valves mounted therein. Thus, when pressurized air is supplied from a source to the manifold, each needle valve has a quantity of pressurized air emerging therefrom. The output of each needle valve is supplied by means of suitable tubing, to a porous pad, and each manifold supplies air to six of the pads of which there are twelve in all. Each pad, which preferably comprises porous graphite and which has a smooth porous face, has an input to which the pressurized air from the manifold is supplied. With all of the pads in place and with its pressurized air from the source being at an adjusted value of, for example, fifty-five (55) pounds per square inch, the needle valves and the threaded studs are used to fine tune the air pressure to the point where the carriage floats free of contact with the lathe bed, but properly centered on all axes. The carriage, which may be moved longitudinally by any of a number of drives, such as a worm drive, a rack and pinion drive, or a belt drive, for example, is then movable substantially without friction along the lathe bed, thereby insuring a substantially uniform velocity profile.

Inasmuch as there is no contact between the carriage and the lathe bed, lubrication and contamination of the MCVD process are eliminated.

The hydrostatic carriage arrangement of the application eliminates most of the maintenance associated with existing mechanical linear slide systems, the clogging of the lubricants in the elements, the contaminants to the process area, and velocity uniformities.

Also, because friction is substantially eliminated, the prime mover of the carriage, e.g., rack and pinion, having less of a load thereon, may be downsized in terms of the power requirements necessary to move the carriage.

Heretofore, in the prior art carriage arrangements wherein rolling or sliding elements on the carriage are in physical contact with the rails, for example, of the lathe bed, the movements of the carriage over time create wear on the moving surfaces. The wear is generally non-uniform and may progress to the point where gapping between the moving elements occurs. As the carriage traverses along the length of the bed, areas of binding or loosening may be encountered due to the wear. If a worn condition is present, the maintenance is usually directed to eliminating binding at the tightest point, which means that there will be portions of the carriage traverse that are loose. Some prior art arrangements make use of pre-loaded pivots or other spring loaded systems to maintain a uniform contact force between the moving elements. However, the number of components, which may include moving components, and their complexity impact the effectiveness of the system, and the velocity profile offer time of the carriage is directly depending upon the aforementioned factors.

The floating carriage arrangement of the aforementioned Mueller application overcomes, as pointed out, most of the problems of sticking and binding, provided the lathe bed has not been previously distorted through excess wear. Ideally, it would be a near perfect solution if the existing lathes were replaced with ones having no wear, rail bowing, or the like, but such a replacement would not be economically feasible. It would be preferable if the floating carriage arrangement could be modified to match existing rails and the like of existing lathe beds, thus making retrofit possible.

SUMMARY OF THE INVENTION

The present invention is directed to imparting to the floating carriage of the Mueller application structural elements preferably integral therewith which act as bending beam elements. The properties of the beams which extend substantially parallel to the opposite sidewall, upon which air pads are mounted allow for a spring rate to be designed into the air bearing area which can be tuned for the necessary displacement or force functions to compensate for profile irregularities. By use of such structural pre-load, gapping and binding of the carriage to the bed can be avoided and a more uniform velocity profile obtained.

In more detail, the carriage, which has two sets of air bearing pads, each set having two upper, two lower, and two side pads which are supplied with pressurized fluid, which, preferably, in the MCVD configuration, is air has first and second beams in the side walls thereof having distal ends to which the side pads are mounted. The beams may be machined into the side walls of the carriage or may be mounted thereon, and the beam properties of the geometry allow for a spring rate to be designed into the bearing area to provide adequate compensation by movement of the air bearing pads for carriage contact surface or profile irregularities in the lathe bed. Thus gapping and binding of the carriage to the bed is avoided and a more uniform velocity profile obtained. The deflection and stiffness characteristics of the beams can be matched to the bed vector loads to achieve the desired result of a floating carriage, hence a more uniform operation of the MCVD process.

These and other features and advantages of the present invention will be readily apparent from the following detailed description, read in conjunction with the accompanying drawings.

DETAILED DESCRIPTION

Figure 1:
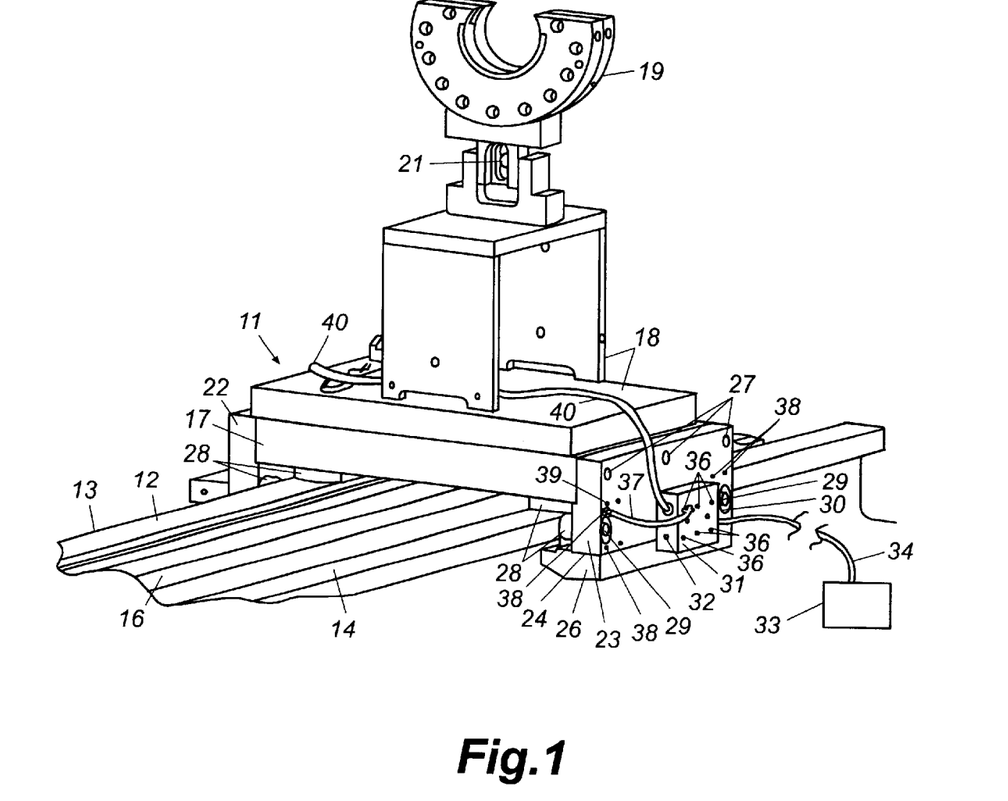
FIG. 1 is a perspective view of the floating carriage arrangement of Mueller application Ser. No. 09/500,154

FIG. 1 is a perspective view of the carriage 11 of the aforementioned Mueller application Ser. No. 09/500,154 depicting the essential parts thereof as mounted on a lathe bed 12. As noted hereinbefore, the present invention will be described as used on a lathe bed 12 used in the MCVD process. However, the invention may be adaptable for other configurations where jerk-free, smooth movement of an element is desired in order, primarily, to produce a uniform velocity profile, as well as to reduce wear. As can be seen in FIG. 1, lathe bed 12 comprises first and second spaced rails or tracks 13 and 14 extending along the length of the bed onto which carriage 11 is movably mounted. Carriage 11 may be driven longitudinally by any suitable or conventional means 16, which schematically represents a rack and pinion drive, but is also intended as a representation of a worm drive or a belt drive, for example. Thus, the carriage 11 is mounted on the rails 13 and 14 and, during operation, driven back and forth along the length thereof by means of the drive 16. Mounted on the top plate 17 of the carriage 11 is a bracket and support member 18 upon which is mounted the torch or heater member 19 used in the MCVD process. As can be seen, torch 19 has a vertical adjustment 21 for fine tuning its vertical height above the bracket 18 and hence, the lathe bed 12. Top plate 17 has depending therefrom spaced side walls 22 and 23 at the bottom 24 of each of which is an inwardly extending flange member 26. As thus far described, carriage 11 is similar to carriages in present use, and may be milled from a single block of suitable metal, such as aluminum, or made from separate metallic parts 17, 22, 23, 26 bolted together as shown by bolts 27, for example. In previous practice, carriage 11 has bearings or slides (not shown) which bear against the rails 13 and 14 and which, as discussed previously, are lubricated to reduce "stick-skip" and "jerk" during movement along lathe bed 12. The carriage 11 is designed and constructed to overcome these problems and to achieve a substantially uniform velocity profile.

As shown in the Mueller application, the usual bearings or slides are replaced by a plurality of pads or air bearings 28 which are porous to the passage of air or other fluid therethrough, being made of, for example, a porous graphite material which has, as will be discussed more fully hereinafter, a smooth, flat, porous face adjacent the rails. Pads 28 are held in place by threaded studs 29 which are carried in threaded bores 30 and which provide adjustment of the pads 28 and thus separation from the surfaces of the rails or ways 13 and 14. While the term "air" is used herein, it is to be understood that other fluids, preferably gaseous but in some cases, possibly liquid, may be used instead of air. An air manifold 31 is mounted on each of the side walls 22 and 23. Each of the manifolds 31 has several air inputs 32, at least one of which (not shown) is connected to a source 33 of pressurized air by an air conduit 34. Where only a single air source 33 is used, one of the input ports 32 on the first manifold 31 can be made to function as an output which is directly connected to the input port 32 that is connected to air source 33, to supply air through an air passage conduit 40 to an input port of the second manifold 31, which is not shown in FIG. 1 but which is substantially identical to the one shown. Alternatively, a bore such as bore 45 in FIG. 3 which passes through carriage 11 can function as an air passage or as an internal passageway for a conduit 40. The second manifold 31 is then connected to the air passage in the same manner as described hereinafter with respect to the air supply to pads 28 through conduits 42 at best seen in FIG. 2. It is, of course, possible to use a second air supply 33 to supply pressurized air directly to the second manifold 31. In FIG. 1 manifold 31 is shown with six air outlets 36, one of which is shown connected through wall 23 to a pad 28 by means of a conduit 37. Six conduits 37 are connected, each through a bore 38 in the side wall, to a pad 28 in the interior open volume defined by the carriage. The conduits 37 can, if desired, be routed around the ends of the carriage 11. The first arrangement is preferred in that the conduits 37 are less likely to become snagged or otherwise interfered with by the lathe mechanisms.

In operation, when air or other fluid material under controlled pressure is applied to the manifold inlet 36, with inlets not in use being plugged, the air is evenly divided among the six outlets 36 and passes through conduits 37 to the individual pads 28, to emerge from their flat faces and force the pads 28 away from the surfaces of the lathe ways 13 and 14. The studs 29 are adjusted to control the limiting spacing of the faces from the ways 13 and 14, and, inasmuch as there are a total of twelve pads; two beneath each way; two adjacent the side of each way; and two above the top surface of each way; the carriage actually floats in contact-free relationship on each of the three axes relative to the lathe 12. The studs 29 enable fine tuning of the structure to set the most desirable spacing of the face of the pads from the adjacent surface of the way. Once tuned, the studs are locked in place by suitable locking means, such as lock nuts 35, one of which is shown in FIG. 3.

Figure 2:
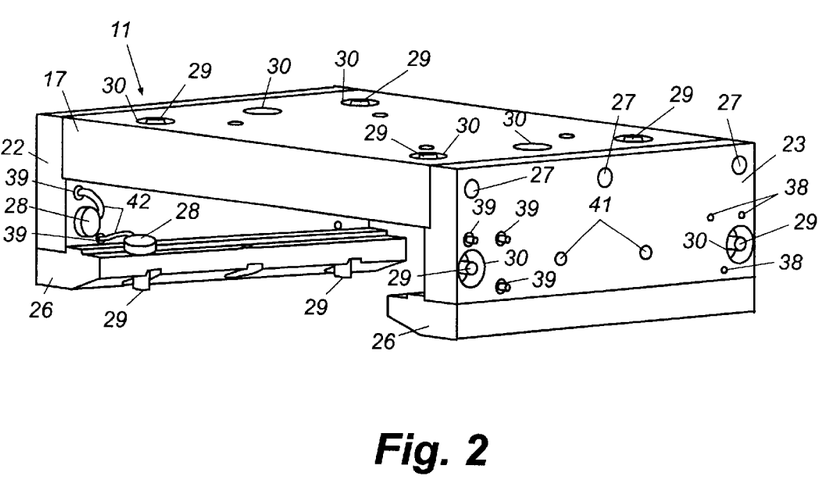
FIG. 2 is a perspective view of the carriage of FIG. 1.

FIG. 2 is a perspective view of the carriage 11 showing, in more detail, some of the elements referred to in the discussion of FIG. 1. It can be seen that, adjacent one of the studs 29 in the sidewall, the bores 38 have couplings 39 mounted therein to which are to be attached the conduits 37 from manifold 31. It is to be understood that all of the bores 38, which total twelve, are to have couplings 39 affixed therein. Alternatively, bores 38 may be made large enough for conduits 37 to pass therethrough, to couple directly to pads 28, or an interior coupler 39 to which conduits 42 are connected. Also shown are bores 41 in sidewall 23 for mounting manifold 31. Although not shown, sidewall 22 has like bores 41 for mounting the second of the two manifold 31. Also shown are two of the twelve pads 28, one mounted on the interior of sidewall 22 facing inwardly and the other mounted on flange members 26 and facing upwardly. The pads 28 are connected via conduits 42 through the bores 38 and couplers 39 to the manifold 31, not shown. The pads 28 are located such that the lower pads are beneath and closely adjacent to and face the smooth undersides of rails 12 and 14; the sidewall pads are closely adjacent to and face the smooth sides of rails 12 and 14; and the upper pads are closely adjacent to and face the smooth top surfaces of the rails 12 and 14. Thus, when pressurized air or other fluid is applied to the porous pads 28, a space is maintained between all of the pads and their corresponding rails and the carriage 11 floats without contacting the rails 12 and 14. Further in order to insure stability of the carriage and prevent it from cocking relative to any of the three axes, the pads are placed relatively far apart so that they are closely adjacent the front and rear ends of the carriage. As will be seen more clearly hereinafter, the pads 28 are not fastened to their corresponding studs 29, being free to "wobble" relative thereto. Thus, the pads 28 are, in effect, self leveling and free from any binding to the end of the stud. It can be seen that, with the arrangement just described, it is not necessary to use lubricants to insure smooth movement of the driven carriage inasmuch as there is virtually no friction between the carriage and its bearings (pads 28) and the lathe.

Figure 3:
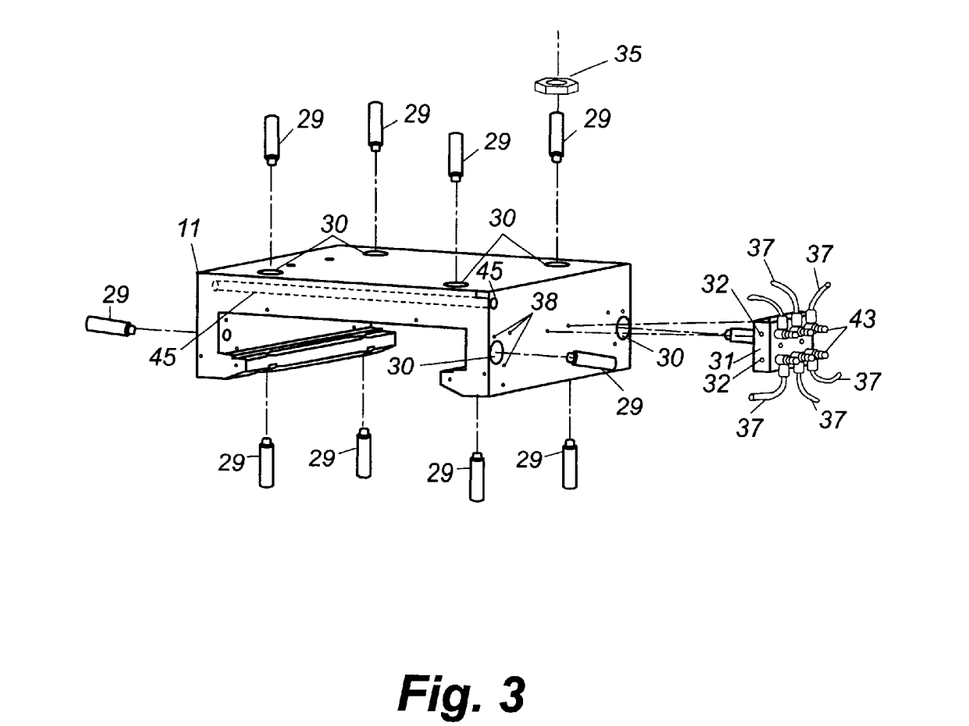
FIG. 3 is an exploded perspective view of elements of the carriage of FIG. 2.

FIG. 3 is an exploded perspective view of the carriage 11 as formed in a single block, having been milled from a block of suitable metal, such as, for example, aluminum, and showing one of the manifolds 31 with needle valves 43 mounted in the outlet holes 36.

Figure 4:
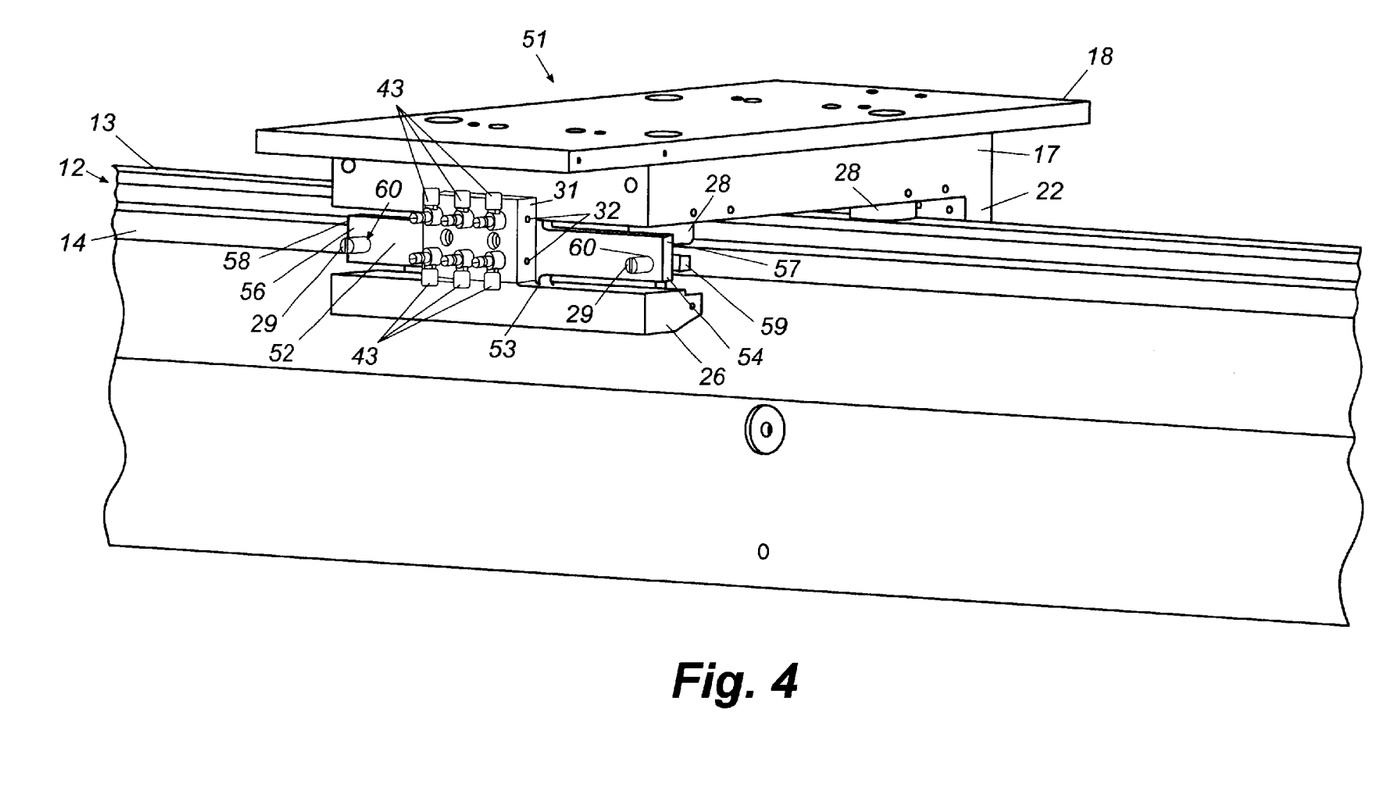
FIG. 4 is a perspective view of the floating carriage of the present invention in place on the lathe bed.

FIG. 4 is a perspective view of the floating carriage 51 of the present invention, as formed from a single block and mounted on a lathe bed 12 having first and second rails or ways 13 and 14. In order to avoid confusion, like paris or elements have been assigned the same reference numerals throughout the several views. As can be seen in FIG. 4, carriage 51 has a top plate 17 upon which is mounted the plate of support member 18. On one side of plate 17 and depending therefrom is sidewall 22 on the bottom edge of which is an inwardly projecting flange member 26 (see FIG. 3). Air bearing pads 28 are positioned on the underside of plate 17.

Figure 5:
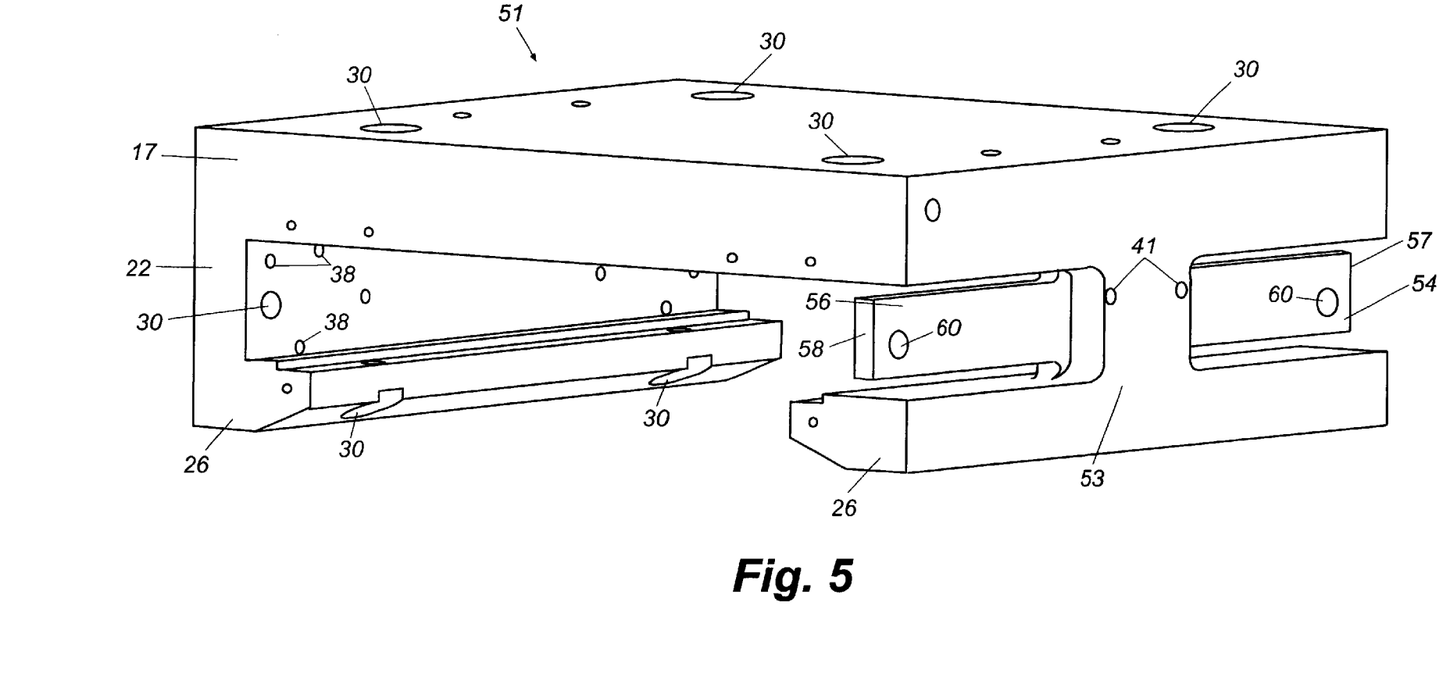
FIG. 5 is a perspective view of the carriage of the invention.

As thus far described, carriage 51 is substantially the same as carriage 11 of FIGS. 1, 2, and 3. In accordance with the present invention, plate 17 has a second sidewall 52 depending therefrom which comprises a central portion 53, to which an air manifold 31 is mounted, and first and second longitudinally extending cantilevered beam members 54 and 56, which are affixed to, preferably integrally with, central portion 53. Beams 54 and 56 and have distal ends 57 and 58, respectively, upon which are mounted air bearing pads 59 (only one of which is shown) and their respective mounted studs 29 in holes 60. It will be noted that pads 59 are rectangular in shape, which illustrates the fact that any or all of the air bearing pads 28 and 59 may be shaped to produce the most desirable result. The beams 54 and 56 are preferably integral with center portion 53 and, as shown in FIG. 5, the entire carriage 51 may be milled from a single block of suitable metal, such as aluminum. Alternatively, the beams 54 and 56 may be mounted to the portion 53. In either case, beams 54 and 56 are constructed to function as bending beam elements, their particular geometry allowing for a spring rate to be designed into the contact area of the air bearings 59 to cause bending from an increase in air pressure. The structure as thus described can be tuned for the necessary displacement of the air bearing pads to compensate for contact surface or profile irregularities. This structural preload compensates for such irregularities, and involves no moving parts (other than bending of the beams 54 and 56). Thus a more uniform motion profile of the carriage velocity is obtained. As the carriage 51 moves along the lathe bed, an irregularlity in the bed, such as bowing, will cause the beam to flex, due to the air pressure emanating from the air bearings 59, rather than causing the carriage itself to move sideways, for example. Thus, the movement of carriage 51 remains smooth, without jerkiness, binding, or yawing. In the arrangement depicted in FIG. 4, only side wall 52 is shown with bending beams 54 and 56, and the other air bearing locations and mountings are substantially the same as shown in the aforementioned Mueller patent application. It is possible, and may even be desirable in certain applications to use more than one set of bending beams. In general, it is desirable to have the bending beams, such as beams 54 and 56, opposite a "hard" site of air bearings 28 mounted in depending wall 22. The "hard" site functions as a reference, and follows any bends, for example, in the rail 13. The bending beams 54 and 56 will, however, compensate for such bends and maintain the air bearings 59 at the proper gap relative to rail 14, thereby preventing binding or contact between the rails and the carriage. In the arrangement of FIGS. 4 and 5, there are two air bearing pads 59 opposite two pads 28 in sidewall 22, thus presenting two reference points and two flex points in a symmetrical "square" configuration. Such an arrangement works well in preventing wobbling or hunting of the carriage, and is a preferred configuration. It is possible, however, to use other configurations such as, for example, triangular. It is also possible to use bending beams in either the top or bottom of the carriage, or to use flex points opposite each other, such as, for example, in both sidewall 22 and sidewall 52. This latter arrangement, unless the deviations in the lathe bed are known, so that the degree of flexure may be precisely set, will not necessarily function as well as the other arrangements tending to cause, among other things, hunting of the carriage as is moves along the track.

Figure 6A:
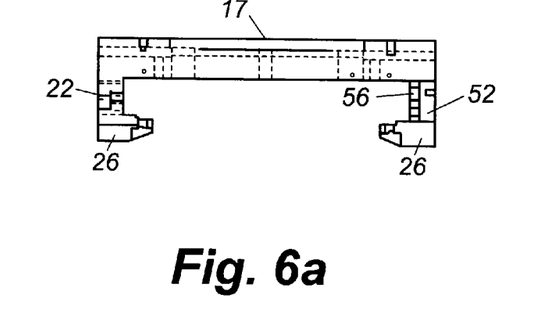
FIGS. 6a through 6c are a front elevation view, a side elevation view, and a plan view of the carriage of FIGS. 4 and 5.
Figure 6B:
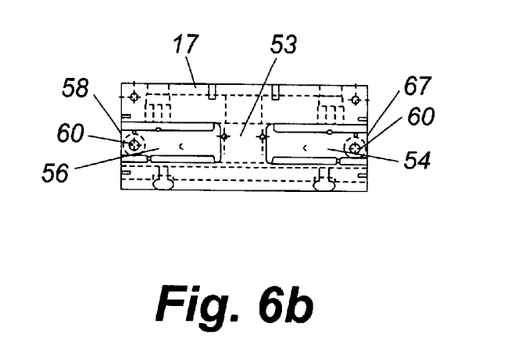
Figure 6C:
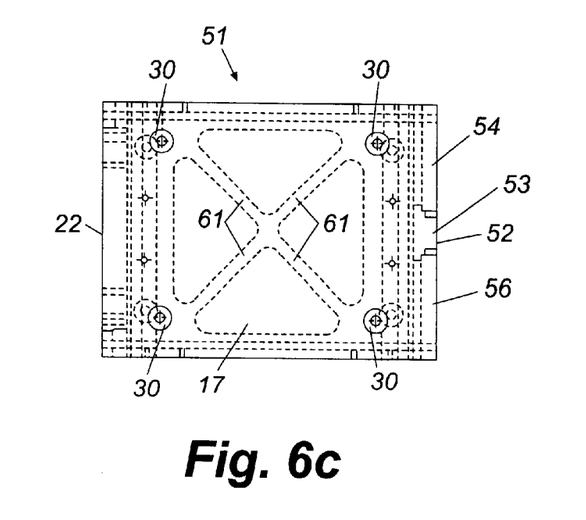

FIGS. 6a, 6b and 6c illustrate the overall configuration of the carriage 51 in a front elevation view, a side elevation view, and a top plan view respectively. Carriage 51 as depicted in these figures has its top plate 17 milled out (or cast) to form reinforcing ribs 61 in order to lighten the overall carriage 51. It can also be seen in these figures that the beam 54 and 56 are of a lesser thickness than sidewall 52, or, more specifically, center portion 53. Whether the carriage is cast, milled from a solid block, or pieced together, the thickness of the beams 54 and 56 are such that there is sufficient flexure to compensate for changes in spacing or gap between the air bearing pad and the lathe rails or ways. The beams can be "tuned" by varying their thickness, with the thinner beams having greater flexure. Thus, the velocity profile remains substantially uniform despite variations in the lathe ways which would otherwise cause variations in the velocity profile. Tuning of the beam essentially consists of designing the beam to have a spring rate which is matched to the lathe bed vector loads.

While the present invention has been shown and described in the context of the moving carriage in the MCVD process, it is readily adapted to other equipment or machines wherein a uniform velocity profile, or at least uniform air bearing action is required or desired, without the introduction of separate moving parts.

It is to be understood that the various features of the present invention might be incorporated into other types of apparatus and that other modifications or adaptations might occur to workers skilled in the art. All such variations and modifications are intended to be included herein as being within the scope of the invention as set forth in the claims. Further, in the claims hereinafter, the corresponding structures, materials, acts, and equivalents of all means or step-plus-function elements are intended to include any structure, material, or acts for performing the functions in combination with other elements as specifically claimed.

What is claimed is:

1. A carriage member for use on a bed having rails with guiding surfaces, said carriage member comprising:

a carriage body having a top plate having and underside, first and second side walls depending from said plate, each having an interior surface, and first and second flange members on the bottom of said side walls extending therefrom toward each other;

air bearing members mounted on said plate on the underside thereof for overlying a top guiding surface of the rails; and said second side wall having a first cantilevered beam member having an inner surface extending from a central portion of said second side wall, said first beam member having a distal end to which first air bearing member is mounted on the inner surface thereof.

2. A carriage member as claimed in claim 1 wherein said first cantilevered beam member has a spring rate adequate to move said first air bearing member to compensate for irregularities in the guiding surfaces.

3. A carriage member as claimed in claim 2 and further including a second cantilevered beam member having an inner surface extending from said central portion of said side wall, said second beam member having a distal end to which a second air bearing member is mounted on the interior surface thereof.

4. A carriage member as claimed in claim 3 wherein said second cantilevered beam member has a spring rate adequate to move said second air bearing member to compensate for irregularities in the guiding surfaces.

5. A carriage member as claimed in claim 4 wherein said second cantilevered beam member extends from said central portion in a direction opposite that of said first cantilevered beam member to establish a spacing between said first and second air bearing members.

6. A carriage member as claimed in claim 5 wherein said first side wall has a third air bearing member mounted on the interior surface thereof.

7. A carriage member as claimed in claim 6 wherein said first side wall has a fourth air bearing member mounted on the interior surface thereof and spaced from said third air bearing member a distance substantially equal to the spacing between said first and second air bearing members.

8. A carriage member as claimed in claim 1 wherein said carriage member is made of metal.

9. A carriage member as claimed in claim 1 wherein said carriage member is made from a single block of metal.

10. A carriage member as claimed in claim 1 wherein said first cantilevered beam member is integral with said central portion of said second side wall.

11. A carriage assembly for use on a machine bed having rails with guiding surfaces and comprising:

a carriage member having a top plate, first and second side walls depending from said plate, and first and second flange members on the bottom of said side walls extending from said side walls toward each other;

said top plate having a first pair of spaced air bearing members overlying a top guiding surface of the rails;

said first side wall having a second pair of spaced air bearing members positioned to be adjacent a side guiding surface of one of said rails;

said second side wall having a central portion and first and second cantilevered beams extending from said central portion substantially parallel to said first side wall and spaced therefrom, each of said beams having a distal end; and a third pair of spaced air bearings, each air bearing of the pair being mounted to one of said distal ends and positioned to be adjacent the guiding surface of another of said rails.

12. A carriage assembly as claimed in claim 11 and further comprising at least one manifold member for supplying pressurized air to said air bearing members.

13. A carriage assembly as claimed in claim 12 wherein said at least one manifold member is mounted to said central portion of said second side wall.

14. A carriage assembly as claimed in claim 13 wherein said at least one manifold member has value members for controlling the quantity of air delivered to each of said air bearing members.

* * * * *